(12) United States Patent
Ke

(10) Patent No.: US 8,537,226 B2
(45) Date of Patent: Sep. 17, 2013

(54) VOICE COIL MOTOR AND CAMERA MODULE HAVING SAME

(75) Inventor: Chau-Yuan Ke, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 2 days.

(21) Appl. No.: 13/181,463

(22) Filed: Jul. 12, 2011

(65) Prior Publication Data

US 2012/0300111 A1  Nov. 29, 2012

(30) Foreign Application Priority Data

May 26, 2011  (TW) ............................... 100118401 A

(51) Int. Cl.
*H04N 5/225* (2006.01)
*H02K 41/03* (2006.01)

(52) U.S. Cl.
USPC .................. 348/208.7; 348/208.11; 348/335; 348/357; 396/133; 396/144

(58) Field of Classification Search
None
See application file for complete search history.

(56) References Cited

U.S. PATENT DOCUMENTS

| 2006/0132613 | A1* | 6/2006 | Shin et al. ................... 348/208.7 |
| 2007/0047942 | A1* | 3/2007 | Chang et al. .................. 396/133 |
| 2007/0086769 | A1* | 4/2007 | Watanabe et al. ............. 396/133 |
| 2007/0108847 | A1* | 5/2007 | Chang ............................ 310/12 |
| 2008/0007846 | A1* | 1/2008 | Wu et al. ....................... 359/814 |
| 2008/0007850 | A1* | 1/2008 | Huang .......................... 359/824 |
| 2009/0244731 | A1* | 10/2009 | Yu ................................. 359/824 |
| 2010/0329654 | A1* | 12/2010 | Chiang .......................... 396/55 |

* cited by examiner

*Primary Examiner* — James M Hannett
*Assistant Examiner* — Dwight C Tejano
(74) *Attorney, Agent, or Firm* — Altis Law Group, Inc.

(57) ABSTRACT

A voice coil motor includes an outer shell, a moveable frame, a coil of wire, a number of magnetic members and a first elastic member. The outer shell includes a number of sidewalls connected to each other end-to-end. The moveable frame is moveably received in the outer shell. The coil of wire is wrapped around the moveable frame and is received in the outer shell. Each of the magnetic members is attached to a corner formed by two inner surfaces of two adjacent sidewalls. The magnetic members and the coil of wire are configured for cooperating to drive the movable frame to move in the outer shell. The first elastic member is attached to the moveable frame and received in the outer shell. The first elastic member is configured for providing an elastic restoring force.

10 Claims, 5 Drawing Sheets

VOICE COIL MOTOR AND CAMERA MODULE HAVING SAME

BACKGROUND

1. Technical Field

The present disclosure relates to motors, and particularly to a voice coil motor and a camera module having the same.

2. Description of Related Art

Voice coil motors (VCMs) are widely used, for example, as lens actuators in camera modules. Camera modules have become miniaturized over time, and thus VCMs are correspondingly being required to be made smaller and smaller.

A typical VCM includes an outer shell housing one or more magnets fixed to a frame, a moveable frame wrapped by a coil of wire, and one or two elastic members connected between the lens retainer and the frame. The immovable frame is movable in the outer shell due to an interaction between the coil of wire and the magnetic members.

However, with the above configuration, too many elements are needed for the VCM. In addition, when the VCM is used in a camera module, a base is also needed for accommodating an image sensor, thus the entire camera module is not as compact as it could be.

What is needed, therefore, is a voice coil motor and a camera module, which can overcome the above shortcomings.

DETAILED DESCRIPTION

Embodiments of the present voice coil motor (VCM) and camera module will now be described in detail and with reference to the drawings.

Figure 1:
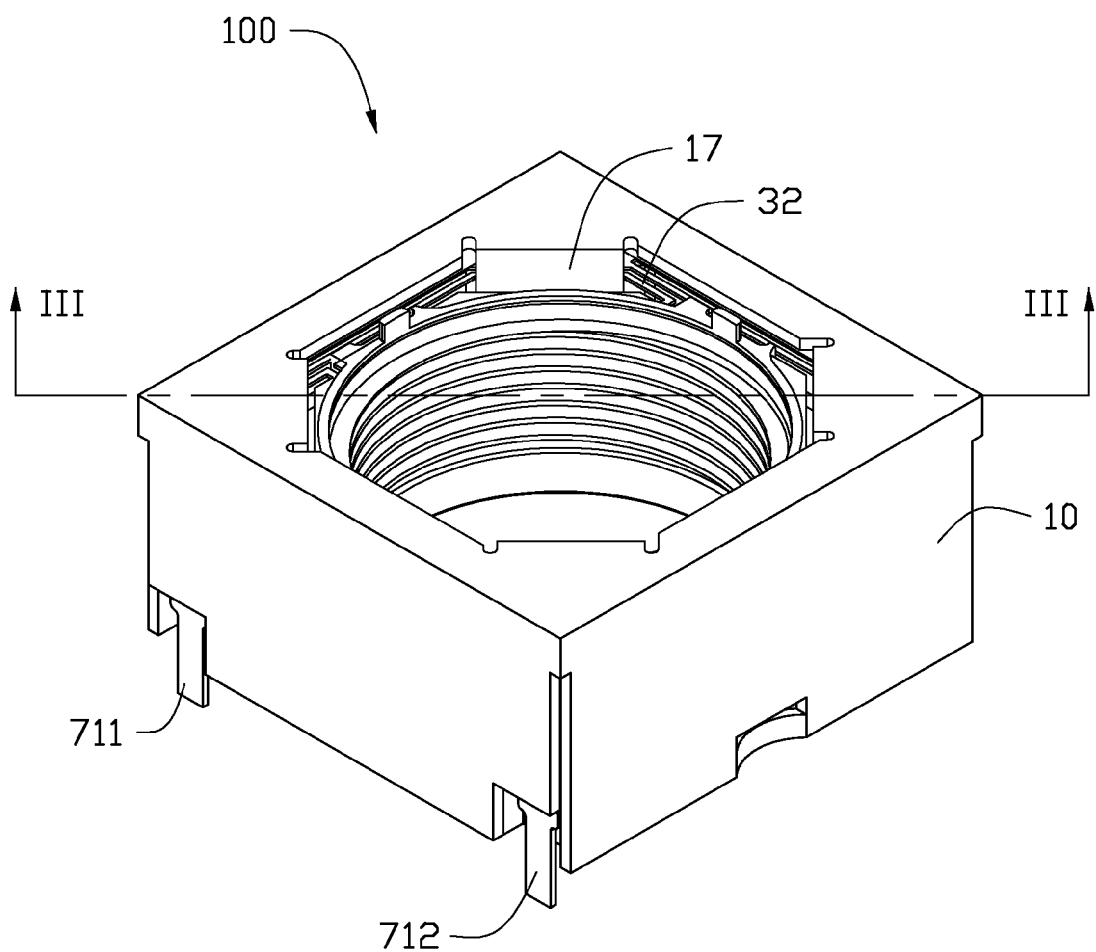
FIG. 1 is a schematic view of a voice coil motor in accordance with a first embodiment.
Figure 2:
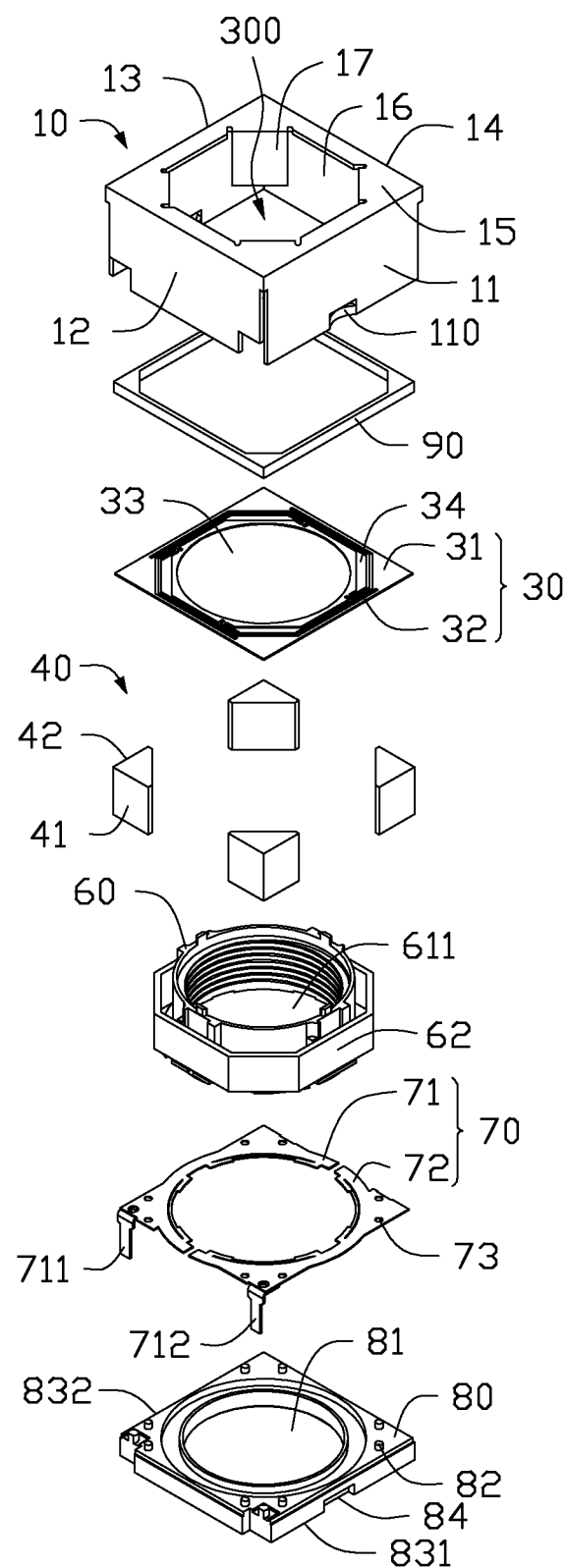
FIG. 2 is an exploded view of the voice coil motor of FIG. 1.
Figure 3:
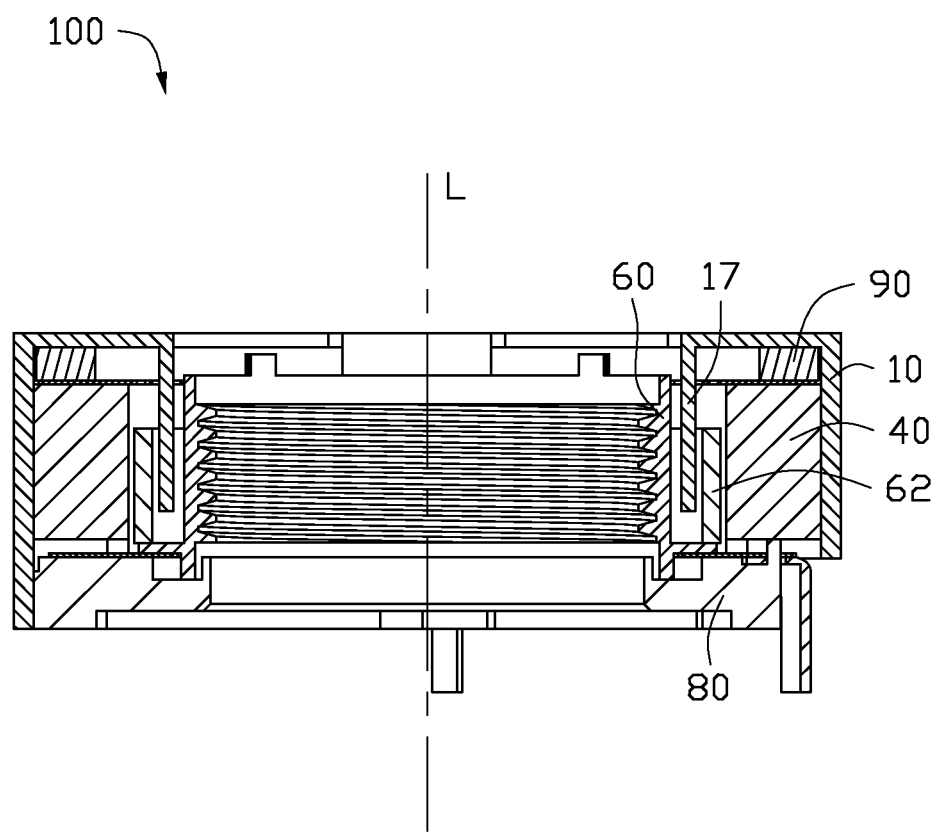
FIG. 3 is a sectional view of the voice coil motor shown in FIG. 1, taken along line III-III.

Referring to FIGS. 1 to 3, a VCM 100 in accordance with a first embodiment is provided. The VCM 100 mainly includes an outer shell 10, a spacer 90, an upper elastic member (first elastic member) 30, four magnetic members 40, a movable frame 60, a coil of wire 62, a lower elastic member (second elastic member) 70, and a base 80.

The outer shell 10 is substantially square in horizontal section and includes a top plate 15, a first sidewall 11, a second sidewall 12, a third sidewall 13 and a fourth sidewall 14. The first side wall 11 opposes the third sidewall 13. The first sidewall 11 is substantially perpendicular to the second sidewall 12 and the fourth sidewall 14. The second sidewall 12 is substantially perpendicular to the first sidewall 11 and the third sidewall 13. The first sidewall 11 and the third sidewall 13 connect the second and fourth sidewalls 12, 14. The second sidewall 12 opposes the fourth sidewall 14. The first, second, third and fourth sidewalls 11, 12, 13, 14 are connected to the four respective edges of the top plate 15. The first, second, third and fourth sidewalls 11, 12, 13, 14 and the top plate 15 cooperatively form a space 300 receiving the moveable frame 60, the coil of wire 62, the magnetic members 40, the upper elastic member 30 and the lower elastic member 70 therein. A first through hole 16 is defined in the center of the top plate 15. The first through hole 16 is in communication with the space 300. A projection 110 is formed at a lower edge of each of the first sidewall 11 and the third sidewall 13. The outer shell 10 is made of ferromagnetic materials.

Figure 4:
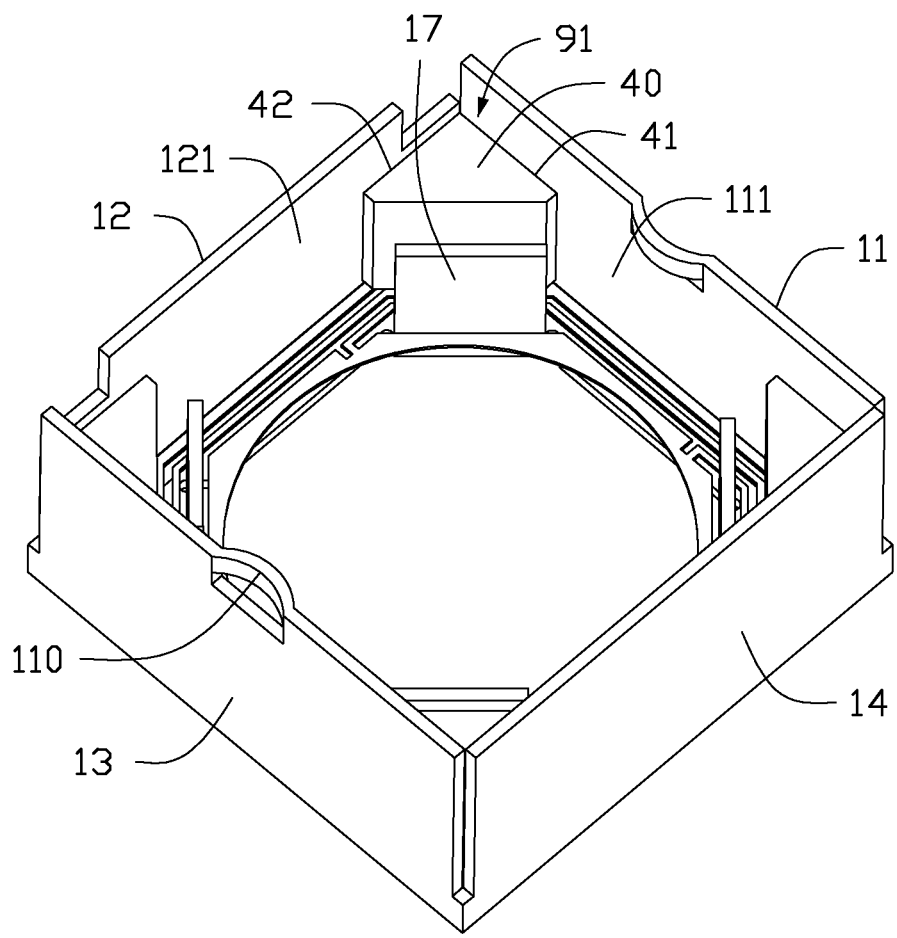
FIG. 4 is a schematic view of the voice coil motor of FIG. 2 partially assembled.

The four magnetic members 40 are permanent magnets and configured for generating a magnetic field in the outer shell 10. Each of the four magnetic members 40 is substantially a triangular prism. Referring to FIGS. 2 and 4, one of the four magnetic members 40 is taken as an example in describing the manner of attachment of the magnetic members 40. The four magnetic member 40 include a first side surface 41 and a second side surface 42 connected perpendicularly to the first side surface 42 in this embodiment. The first sidewall 11 includes a first inner surface 111. The second sidewall 12 includes a second inner surface 121. The first side surface 41 is attached to the first inner surface 111 and the second side surface 42 is attached to the second inner surface 121 so that the magnetic member 40 is attached to a corner 91 formed by two inner surfaces 111, 121 of two adjacent sidewalls 11, 12. Therefore, the four magnetic members 40 are directly secured to the outer shell 10 rather than requiring an extra fixing frame. Therefore, the VCM 100 is compact.

The upper elastic member 30 is substantially plate-shaped. A second through hole 33 is defined in the center of the upper elastic member 30. The upper elastic member 30 includes an elastic portion 32, and a rigid portion 31 surrounding the elastic portion 32. The elastic portion 32 and the rigid portion 31 flank the second through hole 33. The elastic portion 32 is adjacent to the second through hole 33 and the rigid portion 31 forms an outer frame for the elastic portion 32. The spacer 90 is rectangular-shaped and is sandwiched between the rigid portion 31 and the top plate 15. The four magnetic members 40 urge the upper elastic member 30 against the spacer 90 to retain the upper elastic member 30 in place. The spacer 90 provides a sufficient space for necessary movement or deformation of the elastic portion 32.

For ease in assembling the VCM 100, the outer shell 10 includes a number of protrusions 17. The protrusions 17 depend from an inner edge of the top plate 15 and into the first through hole 16. Cutouts 34 are defined in the upper elastic member 30. The protrusions 17 extend through the upper elastic member 30 through the cutouts 34 and server as a magnetic flux guide meaning.

The movable frame 60 is substantially a moveable lining. A threaded through hole 611 is defined in a center of the moveable frame 60. A lens unit 210 (see FIG. 5) is threadedly received in the threaded through hole 611. The coil of wire 60 is wrapped around the moveable frame 60.

The lower elastic member 70 is an electric conductor and includes a third through hole, an elastic portion and a rigid portion (not labeled) similar to those of the upper elastic member 30. The difference between the lower elastic member 70 and the upper elastic member 30 is that the lower elastic member 70 is diametrically divided, consisting of a first part 71 and a separate second part 72. A first lead 711 extends from the first part 71 and a second lead 712 extend from the second part 72. The first lead 711, the first part 71, the coil of wire 62, the second part and the second lead 712 are connected in series. Therefore, the first lead 711 and the second lead 712 can be connected to a power supply (not shown). In this way, the coil of wire 62 can be charged and generate a magnetic field. A number of positioning through holes 73 are defined in the four corners of the lower elastic member 70.

The elastic portions of the upper elastic member 30 and the lower elastic member 70 are respectively attached to the upper and lower ends (opposite ends) of the moveable frame 60. The upper elastic member 30 and/or the lower elastic member 70 return the moveable frame 60 to a resting position when the coil of wire 62 is not energized.

A fourth through hole 81 is defined in a center of the base, having a size substantially the same as that of the threaded through hole 611. The base 80 further has a number of posts 82 thereon. The post 82 are intended for engagement in the positioning through holes 73 of the lower elastic member 70, and glue or other fixative may be applied thereon to further secure the lower elastic member 70 to the base 80. A first recess 84 is defined in a first side 831 of the base 80 corresponding to the first sidewall 11 and a second recess (not labeled) is defined in a second side 832 of the base 80 corresponding to the third sidewall 13. When the base 80 is impressed into the outer shell 10, the projections 110 are engaged in the first recess 84 and the second recess so that the base 80 is attached to the outer shell 10. Glue or some other means of fixation may be applied to the projections 110, the first recess 84 and the second recess to further secure the base 80 into the outer shell 10.

In operation, the movable frame 60 is movable upwards and downwards along the central axis L of the moveable frame 60 in the outer shell 10 due to the interaction between the charged coil of wire 62 and the magnetic members 40, and is immobile between the upper and lower elastic members 30, 70 when the coil of wire 62 is not energized.

In alternative embodiments, the upper elastic member 30 can be further secured by glue or bolts. The spacer 90 can be omitted and a thickness of the rigid portion 31 can be made greater than that of the elastic portion 32 to provide sufficient space for movement or deformation of the elastic portion 32. The structure of the lower elastic member 70 may be the same as that of the upper elastic member 30, and the first lead 711 and the second lead 712 can be isolated from the lower elastic member 70. The first lead 711, the coil of wire 62 and the second lead 712 are connected in series.

Figure 5:
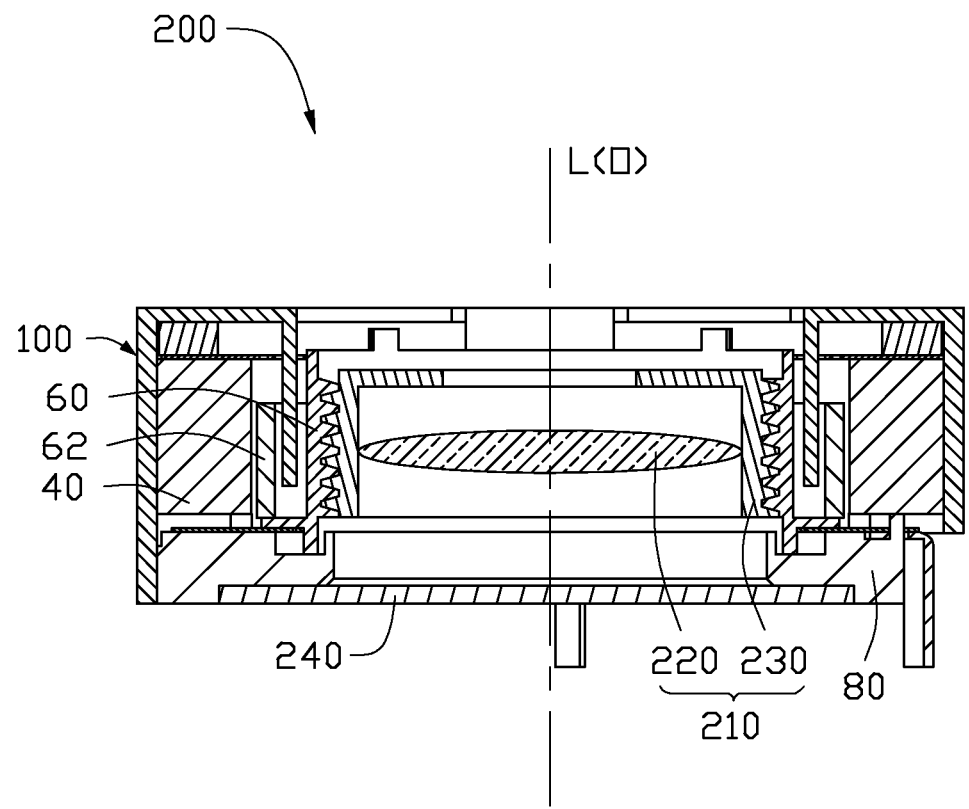
FIG. 5 is a sectional view of a camera module in accordance with a second embodiment.

Referring to FIG. 5, a camera module 200 in accordance with a second embodiment, is provided. The camera module 200 includes the VCM 100 of the first embodiment, a lens unit 210 and an image sensor 240.

The optical axis O of the lens unit 210 coincides with the central axis L of the moveable frame 60. The lens unit 210 is secured in the moveable frame 60. The lens unit 210 includes a lens group 220 and a lens barrel 230. The lens group 220 in the lens barrel 230 may include one or more lenses. The lens barrel 230 is externally threaded and engagable with the interior thread of the moveable frame 60. The lens unit 210 in the lens barrel 230 protects and covers the image sensor 240, which is accommodated in the base 80, and thus no separate base for the image sensor 240 is required, therefore the entire camera module 200 is compact.

In operation, the movable frame 60 together with the lens unit 210 is movable upwards and downwards along the central axis L of the moveable frame 60 (optical axis O of the lens unit 210) in the outer shell 10 due to the interaction between the charged coil of wire 62 and the magnetic members 40.

In alternative embodiments, the lens unit 210 may further include a lens holder coupled to the lens barrel 230 and the image sensor 240 may be affixed in the lens holder rather than in the base 80. The lens barrel 230 may be omitted and the lens group 220 may be directly attached to the inner wall of the moveable frame 60. In addition, the shape of the outer shell 10 and the base 80 may be different, and the number of the magnetic members 40 may vary.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A voice coil motor, comprising:
    an outer shell comprising a plurality of sidewalls connected to each other end-to-end, a top plate connected to the sidewalls and defining a through hole in the center thereof, and a plurality of protrusions depending from the top plate and into the through hole, the sidewalls and the top plate cooperatively forming a space;
    a moveable frame moveably received in the space;
    a coil of wire wrapped around the moveable frame and received in the space;
    a plurality of magnetic members received in the space and each attached to a corner formed by two intersecting inner surfaces of two adjacent sidewalls, the magnetic members and the coil of wire configured for cooperating to drive the movable frame to move in the outer shell;
    a first elastic member attached to the moveable frame and received in the space, the first elastic member configured for providing an elastic restoring force, the protrusions extending through the first elastic member; and
    a spacer sandwiched between the first elastic member and the top plate, the magnetic members urging the first elastic member against the spacer to retain the first elastic member.

2. A camera module, comprising:
    a lens unit;
    an image sensor; and
    a voice coil motor, the voice coil motor comprising:
        an outer shell comprising a plurality of sidewalls connected to each other end-to-end, a top plate connected to the sidewalls and defining a through hole in the center thereof, and a plurality of protrusions depending from the top plate and into the through hole, the sidewalls and the top plate cooperatively forming a space;
        a moveable frame moveably received in the space;
        a coil of wire wrapped around the moveable frame and received in the space;
        a plurality of magnetic members received in the space and each attached to a corner formed by two intersecting inner surfaces of two adjacent sidewalls, the magnetic members and the coil of wire configured for cooperating to drive the movable frame to move in the outer shell;
        a first elastic member attached to the moveable frame and received in the space, the first elastic member configured for providing an elastic restoring force, the protrusions extending through the first elastic member; and
        a spacer sandwiched between the first elastic member and the top plate, the magnetic members urging the first elastic member against the spacer to retain the first elastic member, the lens unit received in the moveable frame, and the image sensor positioned at the image side of the lens unit.

3. The voice coil motor of claim 1, further comprising a second elastic member received in the outer shell, wherein the first elastic member and the second elastic member are respectively attached to opposite ends of the moveable frame.

4. The voice coil motor of claim 3, wherein the second elastic member consists of a first part and a second part spaced from the first part, the voice coil motor further comprises a first lead and a second lead, and the first lead, the first part, the coil of wire, the second part and the second lead are connected in series.

5. The voice coil motor of claim 1, wherein the first elastic member defines a plurality of cutouts corresponding to the protrusions, and the protrusions extend through the first elastic member through the respective cutouts.

6. The camera module of claim 2, further comprising a second elastic member received in the outer shell, wherein the first elastic member and the second elastic member are respectively attached to opposite ends of the moveable frame.

7. The camera module of claim 6, wherein the second elastic member consists of a first part and a second part spaced from the first part, the voice coil motor further comprises a first lead and a second lead, and the first lead, the first part, the coil of wire, the second part and the second lead are connected in series.

8. A voice coil motor, comprising:
   an outer shell comprising a plurality of sidewalls connected to each other end-to-end;
   a moveable frame moveably received in the outer shell;
   a coil of wire wrapped around the moveable frame and received in the outer shell;
   a plurality of magnetic members each attached to a corner formed by two intersecting inner surfaces of two adjacent sidewalls, each of the magnetic members being substantially a triangular prism, each magnetic member comprising a first side surface and a second side surface perpendicularly connected to the first side surface, the first side surface attached to an inner surface of one of the sidewalls, the second side surface attached to an inner surface of the adjacent sidewall, the magnetic members and the coil of wire configured for cooperating to drive the movable frame to move in the outer shell; and
   an elastic member attached to the moveable frame and received in the outer shell, the elastic member configured for providing an elastic restoring force.

9. The voice coil motor of claim 8, wherein the outer shell comprises a top plate connected to the sidewalls, a through hole is defined in the center of the top plate, and the sidewalls and the top plate cooperatively form a space for receiving the moveable frame, the coil of wire, the magnetic members and the elastic member therein.

10. The voice coil motor of claim 9, wherein the outer shell comprises a plurality of protrusions depending from the top plate and into the through hole, and the protrusions extend through the elastic member.

* * * * *